United States Patent
Tse et al.

(10) Patent No.: US 12,348,397 B2
(45) Date of Patent: *Jul. 1, 2025

(54) AUTOMATED IDENTIFICATION OF ANOMALOUS DEVICES

(71) Applicant: Omnissa, LLC, Mountain View, CA (US)

(72) Inventors: Kar-Fai Tse, Peachtree Corners, GA (US); Chaoting Xuan, Duluth, GA (US); Ravish Chawla, Chamblee, GA (US); Erich Stuntebeck, Johns Creek, GA (US); Stephen Jonathan Parry-Barwick, Sydney (AU)

(73) Assignee: Omnissa, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,049

(22) Filed: May 10, 2023

(65) Prior Publication Data

US 2023/0275918 A1   Aug. 31, 2023

Related U.S. Application Data (63) Continuation of application No. 16/918,033, filed on Jul. 1, 2020, now Pat. No. 11,652,832.

(51) Int. Cl.
*H04L 43/0817* (2022.01)
*H04L 9/40* (2022.01)
(Continued)

(52) U.S. Cl.
CPC ...... *H04L 43/0817* (2013.01); *H04L 41/0627* (2013.01); *H04L 41/0813* (2013.01); *H04L 41/147* (2013.01); *H04L 41/149* (2022.05); *H04L 63/102* (2013.01); *H04L 63/1416* (2013.01); *H04L 63/1425* (2013.01); *H04L 63/1441* (2013.01); *H04L 63/20* (2013.01); *H04W 12/121* (2021.01); *H04W 12/37* (2021.01); *H04L 43/028* (2013.01); *H04L 43/0876* (2013.01); *H04L 43/10* (2013.01); *H04L 43/16* (2013.01)

(58) Field of Classification Search
CPC ............. H04L 41/0627; H04L 41/0813; H04L 41/147; H04L 41/149; H04L 43/028; H04L 43/0817; H04L 43/0876; H04L 43/10; H04L 43/16; H04L 63/102; H04L 63/1416; H04L 63/1425; H04L 63/1441; H04L 63/20; H04W 12/121; H04W 12/37
See application file for complete search history.

(56) References Cited

U.S. PATENT DOCUMENTS 8,918,881 B2 *  12/2014  Bettini .............. H04L 63/0823
                                                    713/188
2015/0172321 A1 *  6/2015  Kirti .................. H04L 63/1425
                                                    726/1

(Continued)

*Primary Examiner* — Thomas J Dailey
(74) *Attorney, Agent, or Firm* — Kim & Stewart LLP (57) ABSTRACT

Disclosed are various approaches for automating the detection and identification of anomalous devices in a management service. Device check-ins are received by a management service and housed in a data store. The quantity of device check-ins over various time periods can be analyzed using various approaches to identify anomalous devices.

19 Claims, 6 Drawing Sheets

(51) Int. Cl.
*H04L 41/0604* (2022.01)
*H04L 41/0813* (2022.01)
*H04L 41/147* (2022.01)
*H04L 41/149* (2022.01)
*H04L 43/028* (2022.01)
*H04L 43/0876* (2022.01)
*H04L 43/10* (2022.01)
*H04L 43/16* (2022.01)
*H04W 12/121* (2021.01)
*H04W 12/37* (2021.01)

(56) References Cited

U.S. PATENT DOCUMENTS

| | | | | |
|---|---|---|---|---|
| 2016/0105799 A1* | 4/2016 | Krishna | ................ | H04W 12/35 |
| | | | | 455/411 |
| 2016/0381077 A1* | 12/2016 | Bassias | ................. | G06N 5/047 |
| | | | | 726/23 |
| 2017/0124478 A1* | 5/2017 | Baradaran | ............... | H04L 41/16 |
| 2017/0230334 A1* | 8/2017 | Newell | ................ | H04W 12/37 |
| 2017/0230392 A1* | 8/2017 | Dean | ..................... | G06F 21/552 |
| 2018/0288045 A1* | 10/2018 | Karunakaran | ........ | H04L 63/101 |
| 2018/0309832 A1* | 10/2018 | Jain | ........................ | H04L 67/34 |

* cited by examiner

AUTOMATED IDENTIFICATION OF ANOMALOUS DEVICES

CROSS REFERENCE TO RELATED APPLICATIONS

This application is a continuation of, and claims priority to and benefit of, U.S. application Ser. No. 16/918,003 filed on Jul. 1, 2020, and entitled "AUTOMATED IDENTIFICATION OF ANOMALOUS DEVICES" the foregoing applications are hereby incorporated herein by reference in their entireties.

BACKGROUND

Enterprise mobility management (EMM) systems care utilized to manage potentially large fleets of mobile devices associated with enterprise users. Additionally, in bring-your-own-device (BYOD) environments, where even users who are not issued a device by an enterprise are able to utilize their personal devices to access enterprise data, these "BYOD devices" are often managed, at least in part, by an enterprise management system so that the enterprise can take measures to protect enterprise data and networks. In some enterprises, users may have an enterprise-issued device and a personal device that are both utilized by the user to access enterprise data. For example, the user might have a work-issued mobile device, a personal mobile device, a work-issued laptop computer, and a personal computer that the user might utilize to perform work and access enterprise data.

An enterprise might not want to restrict the number of devices that a user can utilize access data and perform work, but the enterprise still may want to maintain the integrity and security of enterprise resources. Accordingly, the enterprise can utilize EMM systems to facilitate the management of enterprise devices and the management of enterprise data on the personal devices of its user. As the number and mobility of devices increases, these devices are often required to "check in" to an EMM system. The act of a device checking in with a management system creates network and processing load on the management system. Accordingly, reducing the impact of these "check-ins" can reduce the strain on management systems and enterprise networks.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for detecting anomalous devices that are managed by a management system. An anomalous device in the context of this disclosure represents a device generates an anomalous quantity of enrollment events within a management service. An enrollment event is an event during which a client device that is enrolled as managed device performs a device "check-in." A device check-in represents a client device communicating with the management service to query whether there are messages or other data in a command queue associated with the client device. Device check-ins, occurring at enrollment and after enrollment, can generate significant traffic between managed devices and a management service.

An unusually high quantity of device check-ins can utilize unnecessary network and processing resources of the management service, particularly in the situation of a "rogue" device that is generating a very large number of enrollment requests in a very short period of time. Such a situation can operate effectively as a denial of service attack even when the device is merely configured improperly or defective rather than being a malicious attack. In the case of multiple devices that are similarly suited, such a situation an operate as a distributed denial of service attach and represents a significant risk to an enterprise management service. Anomalous devices can present a problem for a management system that is managing a population of devices in an enterprise mobility management (EMM) system.

Additionally, information about identified anomalous devices can be published in a notification channel, which can in turn feed multiple notification mechanisms, such as third party messaging systems, bug tracking systems, or other notifications systems. In some implementations, a notification regarding an identified anomalous device can be accompanied by preconfigured actions that can be transmitted into a notification channel, and an administrative user can respond to the notification and take one of the actions on an identified anomalous device or grouping of devices.

Examples of the disclosure can also generate predictive metrics and analytics regarding future quantities of enrollment events and device check-ins that are generated by managed devices based on a machine learning approach to analyzing historical check-in data. These predictive analytics can allow for capacity planning of a computing device or cluster of computing devices that power a management system. Various machine-learning approaches (e.g., neural networks or Bayesian networks) can be used to identify and predict capacity requirements for a management system based upon historical usage data of the management system.

Figure 1:
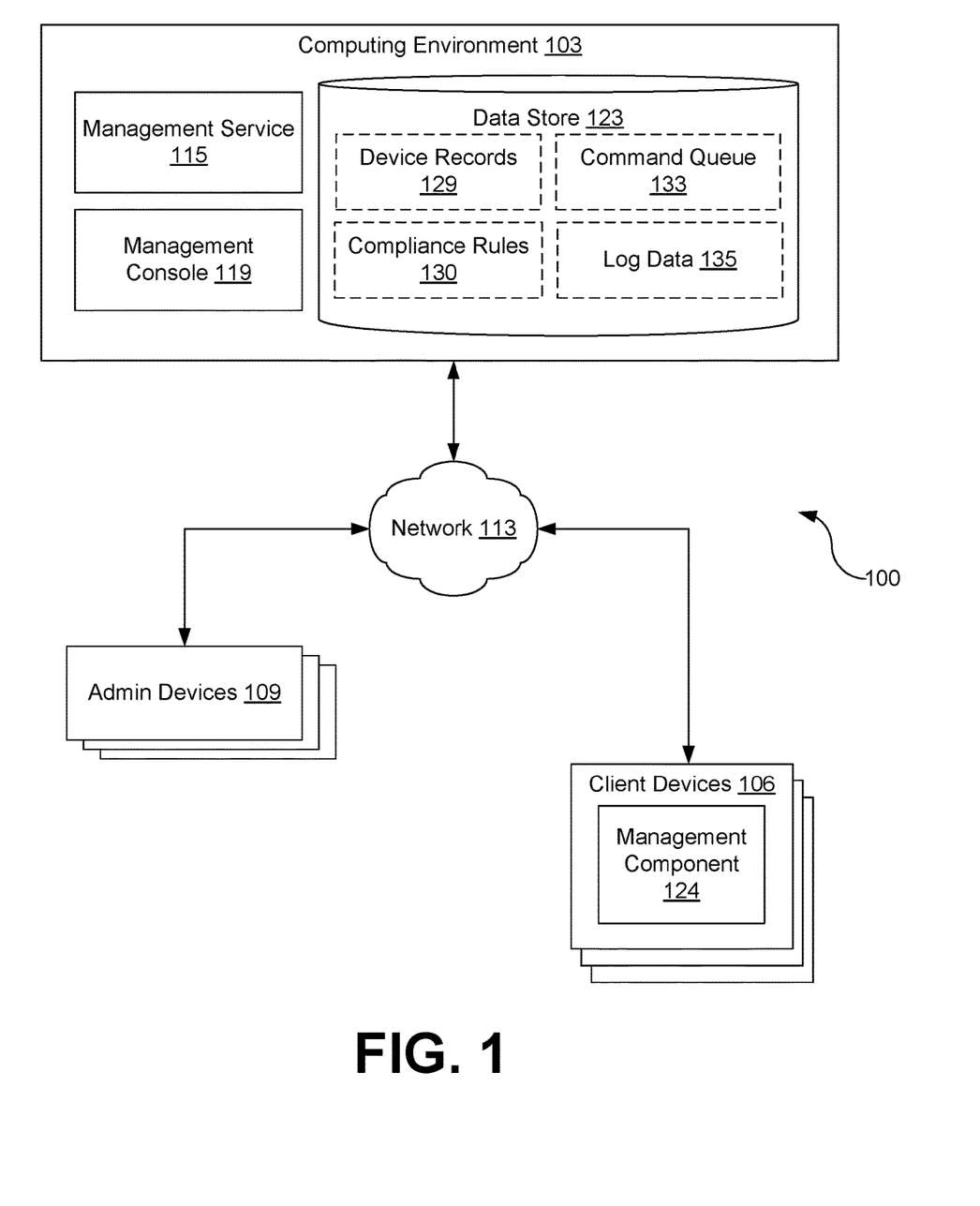
FIG. 1 is a drawing of a network environment according to various implementations of the present disclosure.

FIG. 1 depicts a network environment 100 according to various implementations. The network environment 100 includes a computing environment 103, one or more client devices 106, and one or more admin devices 109, which are in data communication with each other via a network 113. The network 113 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The computing environment 103 can include a server computer or any other system providing computing capability. Alternatively, the computing environment 103 can employ a plurality of computing devices that can be arranged, for example, in one or more server banks, clusters, software defined datacenters, or other arrangements. Such computing devices can be in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various implementations. The components executed on the computing environment 103, for example, include a management service 115, a management console 119, and other applications, services, processes, systems, engines, or functionality not discussed in detail herein.

Also, various data is stored in a data store 123 that is accessible to the computing environment 103. The data store 123 can be representative of a plurality of data stores 123, which can include relational databases, non-relational databases, object-oriented databases, hierarchical databases, hash tables or similar key-value data stores, as well as other data storage applications or data structures. The data stored in the data store 123 is associated with the operation of the various applications or functional entities described below. This data can include one or more device records 129, compliance rules 130, a command queue 133, log data 135 as well as potentially other data.

The management service 115 can oversee the operation of client devices 106 enrolled with the management service 115. In some examples, an enterprise, such as a company, organization, or other entity, can operate the management service 115 to oversee or manage the operation of the client devices 106 of its employees, contractors, customers, or other users having accounts with the enterprise. The management service 115 can further cause device records 129 to be created, modified, or removed from the data store 123. The management service 115 can also detect anomalous devices that take actions with respect to devices with they are identified as such.

The management service 115 can cause various software components to be installed on a client device 106. Such software components can include, for example, client applications, resources, libraries, drivers, device configurations, or other similar components that require installation on the client device 106 as specified by an administrator of the management service 115. The management service 115 can further cause policies to be implemented on a client device 106.

Policies can include, for example, restrictions or permissions pertaining to capabilities of a client device 106 such that access to enterprise data is secured on the client device 106. For example, a policy can include providing access to enterprise data when a client device 106 is in a particular location of an office building during a predefined time window (e.g., between 9:00 AM and 5:00 PM). Also, the policy can include denying access to enterprise data when the client device 106 is not in the location of an office building or outside a time of the predefined time window. Policies can further include enabling or disabling certain functions on the client device 106. In one example, a policy can deny camera or audio recording functions when the client device 106 is at a particular location. Other policies can be implemented, as can be appreciated. The policies can be configured by the administrator depending on the interests or security policies of the enterprise.

The management service 115 can interact with one or more client applications executed on the client device 106. In one example, the management service 115 interacts with a management component 124 on the client device 106 to enroll the client device 106 with the management service 115. When enrolled, the management component 124 can be registered as a device administrator of the client device 106, which can provide the management component 124 with sufficient privileges to control the operation of the client device 106. In one example, the management component 124 can be registered as the device administrator through the installation of a management profile at the operating system of the client device 106 that causes an operating system of the client device 106 to designate the management component 124 or the management service 115 as the device administrator.

The management service 115 can direct the management component 124 to perform device management functions on the client device 106. For example, the management service 115 can direct the management component 124 to control access to certain software or hardware functions available on the client device 106. As a result, the management service 115 can verify that the configuration and operation of the client device 106 is in conformance with predefined criteria that ensures that enterprise data, or other data, is protected from data loss, unauthorized access, or other harmful events.

The management service 115 can further provision enterprise data to the client device 106 through the management component 124. In one example, the management service 115 can cause the management component 124 to control use of the client device 106 or provision enterprise data to the client device 106 through use of a command queue 133 provided by the management service 115. In some examples, the management service 115 can store commands in a command queue 133 associated with a particular client device 106 and can configure the management component 124 executed by the client device 106 to retrieve the contents of the command queue.

In another example, the management component 124 can be configured to periodically poll the management service 115 to retrieve the contents of the command queue 133 on a configured interval or upon detection of a certain event, such as detection of an unauthorized application being executed by the client device 106. The act of periodically polling the management service 115 to retrieve the contents of the command queue 133 can constitute a device check-in. The command queue 133 can contain commands that the management component 124 can carry out on the client device 106, such as commands to install a profile, certificate, application, setting, or take other actions on the client device 106. These other actions can include deleting certain data from the client device 106, transmitting data to the management service 115 or another system, or take any other action on the client device 106. The command queue 133 can be the mechanism by which the management service 115 can manage a device. By placing commands into the command queue 133 for a particular device that are carried out by the management component 124, the management service 115 can maintain management over the client device 106.

In some examples, the management component 124 can provide the credentials of a user or a client device 106 to the management service 115 to enroll the client device 106 with the management service 115 as a managed device. The management component 124 can retrieve policies, profiles, applications, certificates, or other data from the management service 115 upon enrollment of the client device 106 with the management service 115 as a managed device.

The request to enroll the client device 106 with the management service 115 as a managed device can be considered an enrollment event or device check-in. Enrollment events and device check-ins may be used interchangeably in this disclosure and can consume networking and processing resources of the computing environment 103 in which the management service 115 is implemented. The management service 115 can execute one or more server processes to serve a request from the management component 124 to check-in with the management service 115 to retrieve information from its respective command queue 133.

In either case, the management component 124 can retrieve the contents of the command queue by checking in with the management service 115 and requesting the contents of the command queue 133. In one example, the contents of the command queue can include a command that the management component 124 should cause to be executed on the client device 106. In another example, the contents of the command queue can include a resource or client application that the management component 124 should cause to be installed on the client device 106, which the client device 106 may access through a specified uniform resource locator (URL).

Commands issued by the management service 115 for client devices 106, such as to update settings specified in a configuration profile, can be stored in the command queue 133 by the management service 115. As discussed herein, the client device 106 can access the command queue 133 and retrieve and execute any commands stored in the command queue 133 for the client device 106.

The management console 119 can provide an interface for administrator devices 109 to interact with and control the operation of the management service 115. For example, the management console 119 can include a web server that generates one or more web pages that can be displayed on the administrator device 109. An administrative user can interact with the web pages served by the management console 119 to add, remove, or modify device records 129. For instance, the administrative user could use the management console 119 to define device compliance rules 130, add, remove, or update device records 129, and/or other actions. In addition, the management console 119 can also provide a public application programming interface (API) that is accessible across the network 113. Standalone applications installed on an admin device 109 can call or otherwise invoke one or more functions provided by the API to programmatically control the operation of the management service 115, including adding, removing, or modifying device records 129 or taking actions on an anomalous device.

The management service 115 can also provide notifications to administrator devices 109 through a notification channel. A notification channel can be a messaging channel, such as short message service (SMS), rich communication services (RCS), or a third party messaging service. The messaging protocol or messaging service can allow for selectable options to be presented to a user in a messaging client, which can be utilized to receive actions for a particular device or notification, as will be described in further detail below.

A device record 129 can represent data related to a client device 106 enrolled with or otherwise managed by the management service 115. Various types of information or data can be stored in a device record 129, such as the owner or user of a client device 106, policies applicable to a client device 106, configuration settings for the client device 106, the type of client device 106 (e.g., laptop, desktop, smartphone, or tablet), the manufacturer of the client device 106, the model of the client device 106, a list of applications installed on the client device 106 and the respective version, as well as other data.

The compliance rules 130 can include constraints specified by an administrator for a client device 106 to be in "compliance" with the management service 115. The compliance rules 130 can include criteria specified by the administrator or other criteria. In one example, the management component 124 can configure hardware or software functionality of a client device 106 such that the client device 106 is in conformance with the compliance rules 130. For instance, an administrator can specify particular types of software updates that are automatically installed on the client devices 106. Additionally, the management component 124 can identify when the client device 106 is not in conformance with the compliance rules 130, as well as other policies, and can take appropriate remedial actions, such as denying access to enterprise data, denying installation of a software update, or other features of the management component 124.

Log data 135 can include historical data regarding device check-ins and/or enrollment events. Device check-ins can be catalogued in a historical log and associated with a device identifier that uniquely identifies a client device 106 that is enrolled with the management service 115 as a managed device. The management service 115 can then utilize various techniques to identify anomalies in the historical log of device check-ins to identify anomalous devices. As one or more anomalous devices are identified, the management service 115 can notify an administrator through a notification channel or take remedial actions with respect to the identified anomalous devices.

A command queue 133 can represent a set of pending commands or instructions issued by the management service 115 to one or more client devices 106. In some implementations, a command queue 133 may be created for each client device 106 enrolled or registered with the management service 115. Configuration profiles, firmware status requests, or other commands or instructions for a client device may be stored in the command queue 133. At periodic intervals, the client device 106 may retrieve the commands or instructions from the respective command queue 133 for the client device 106. In other implementations, a single command queue 133 may be used for all client devices 106. In these implementations, each command or instruction stored in the command queue 133 may be tagged with a unique identifier for a client device 106. The client device 106 may, at periodic intervals, retrieve any commands or instructions from the command queue tagged with the respective unique identifier for the client device 106.

The client device 106 is representative of one or more client devices that may be connected to the network 113. Examples of client devices 106 include processor-based systems, such as desktop computers, a laptop computer, a personal digital assistant, a cellular telephone, a smartphone, a tablet computer system, smart speakers or similar headless devices, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

A client device 106 can include an operating system configured to execute various client applications. Examples of operating systems include MICROSOFT WINDOWS®, APPLE macOS®, APPLE iOS®, ANDROID®, and various distributions of Linux. The client applications can include web browsers, enterprise applications, social networking applications, word processors, spreadsheet applications, and media viewing applications. The client device 106 can also execute the management component 124.

The management component 124 can maintain communication with the management service 115 in order to perform various actions on the client device 106 in response to instructions received from the management service 115. In some instances, the management component 124 includes a separate application executing on the client device 106. In other instances, the management component 124 includes a device management framework provided by or included in the operating system installed on the client device 106. The management component 124 can be configured to contact the management service 115 at periodic intervals and request that the management service 115 send any commands or instructions stored in the command queue 133 to the management component 124. The management component 124 can then cause the client device 106 to perform the commands (e.g., provide status request, wipe client device 106, etc.) provided by the management service 115 or cause the client device 106 to modify the configuration settings installed on the client device 106 in accordance to any updated or received configuration profiles received from the management service 115.

Compliance rules 130 can specify remedial actions that identify one or more actions that can be taken with respect to a device or grouping of devices if an anomalous device is detected. In some cases, a user interface element that specifies different actions can be included in a notification to admin devices 109 regarding anomalous devices, and a response from an administrator selecting one of the options can be received by the management service 115. In response to receiving a selection from an admin device 109, the management service 115 can be taken the action on one of more anomalous devices identified in the notification.

Generally, a remedial action is any action that can be performed to mitigate or negate the activity of one or more anomalous devices based upon the anomalous activity that it is exhibiting. For example, a compliance rule 130 can specify that a device that is causing an anomalous quantity of device check-ins over a short period of time can be removed as a managed device. As another example, the anomalous device can be instructed to suppress device check-ins for a period of time. In some cases, the anomalous device can be factory reset by the management service 115. In another scenario, the management service 115 can lock the user account and/or logs the user out of his or her client devices 106 automatically. As another example, the management service 115 can disconnect or block a potentially anomalous device from connecting to the network 113 or place the client device 106 into a quarantine state. Additionally, the management service 115 can configure a firewall to block network traffic to or from an IP address (e.g., an IP address associated with a brute-force attack) of the client device 106. Similarly, the management service 115 can block data transfers to a particular client device 106 or IP address. Although these examples are illustrative examples of remedial actions, administrative users can create or specify other types of remedial actions as desired for their particular implementations.

Next, a general description of the operation of the various components of the network environment 100 is provided. Although the following description provides an illustrative example of the operation of the network environment 100, more detailed descriptions of the operation of individual components are provided in the following figures.

To begin, client devices 106 can be enrolled as managed devices with the management service 115. As noted above, managed devices can cause various device check-ins to be generated within the management service. The events can include requests to enroll a client device 106 as a managed device, data that is reported to the management service 115 on behalf of a client device 106, or a device check-in.

The management service 115 can log device check-ins from a particular client device 106 in the data store 123 as log data 135 and analyze the historical enrollment data to identify anomalous devices. Anomalous devices are those that generate a higher than normal quantity of device check-ins over a time period. As anomalous devices are identified, the management service 115 can generate notifications that are published to a notification channel. A notification channel can represent a mechanism to notify an administrator of the management service 115. The notification channel can be a messaging or collaboration service that allows for messages to be placed into channels, such as SLACK® or MICROSOFT® TEAMS. In some instances, the notification channel can allow for a user to submit a response to a notification, which can be provided to the originator of the notification.

In this scenario, the management service 115 can be the recipient of a response to a notification. For example, the management service 115 can identify an anomalous device, place a notification into one or more notification channels about the anomalous device, and obtain a response to the notification that specifies an action to be taken with respect to the anomalous device. The action can be one or more of a set of actions that can be prepopulated into a notification. For example, an anomalous device can be quarantined, wiped, removed from management, or commanded to cease generating device check-ins for a period of time as commanded by the administrative user through a response to a notification in the notification channel.

The management service 115 can perform different types of analyses on device check-ins that are cataloged as log data 135. In one scenario, the management service 115 can identify an anomalous device by identifying client device 106 that has caused a high number of device check-ins to be generated over a time period, such as the most recent five minutes, ten minutes, etc. The time period can also be a configurable time period during which managed devices are expected to check in once with the management service 115. The management service 115 can calculate an average quantity of device check-ins generated by a population of managed devices over a time period. In some instances, the management service 115 can calculate a variance or variance factor in the quantities of device check-ins over the time period.

The management service 115 can identify those client devices 106 that are associated with a quantity of device check-ins that is higher than a threshold quantity over the time period. In one example, anomalous devices are those that have generated a quantity of device check-ins that is 1.5 times, three times, or another multiple of a calculated variance of the quantities of device check-ins. In another example, anomalous devices are those that 1.5 or three standard deviations above a mean quantity of device check-ins over the time period. A multiple of the variance in this respect can be referred to as a variance factor.

The management service 115 can also identify anomalous devices by analyzing a larger time period. When analyzing a larger time period, which can be on the scale of hours, days, or weeks, point anomalies can be detected by identifying those devices that generate a quantity of device check-ins that are greater than an average quantity by less than the threshold quantity that is used to analyze the smaller time period above.

In another example, a periodic anomaly can be detected by identifying those devices that are associated with a greater than average quantity by less than the threshold for analyzing the smaller time period but that exhibit a repetitive quantity of device check-ins over multiple time periods. In some examples, the frequency domain can be utilized or analyzed to identify patterns of periodicity. In another example, cluster anomalies can be detected by identifying a cluster of client devices that generate a quantity of device check-ins that are greater than an average quantity by less than the threshold quantity that is used to analyze the smaller time period above.

Cluster anomalies can also be detected by identifying devices that have a greater number of device check-ins during a particular time period and determining whether they can be grouped into cluster according to a parameter. The client devices 106 can be grouped in a cluster by a parameter, such as a property of the client device 106, an operating system of the client device 106, a manufacturer and/or model of the client device 106, versions of other applications installed on the client device 106, or other properties by which the devices can be grouped. Clusters can be generated, for example, by utilizing a clustering process, such as Hierarchical Agglomerative Clustering. Clusters with less than a threshold number of devices, such as ten or fewer devices, can be considered cluster anomalies.

Cluster anomalies can then be classified into various types. For example, anomalies can be automatically categorized as point anomalies, periodic anomalies, and cluster anomalies. The clustering process may determine that a large number of devices are not assigned to a cluster because they are simply not anomalies. For example, a grouping that contains 50% or greater than the population of the managed devices can be considered non-anomalous, or normal.

A point anomaly can be identified by quantizing a data set associated with a threshold quantity of device check-ins over a time period and observing a peak. A periodic anomaly can be identified by observing the signal in the frequency domain using a fast Fourier transform (FFT) and observing a spike above a certain threshold. The periodicity of the spike can also be observed. A cluster anomaly can be identified by identifying a grouping of devices that has a threshold number of devices between a minimum threshold and a maximum threshold.

By grouping client devices 106 into a cluster, the administrator can be assisted in determining an appropriate action to take with respect to the cluster to address the anomaly.

Figure 2:
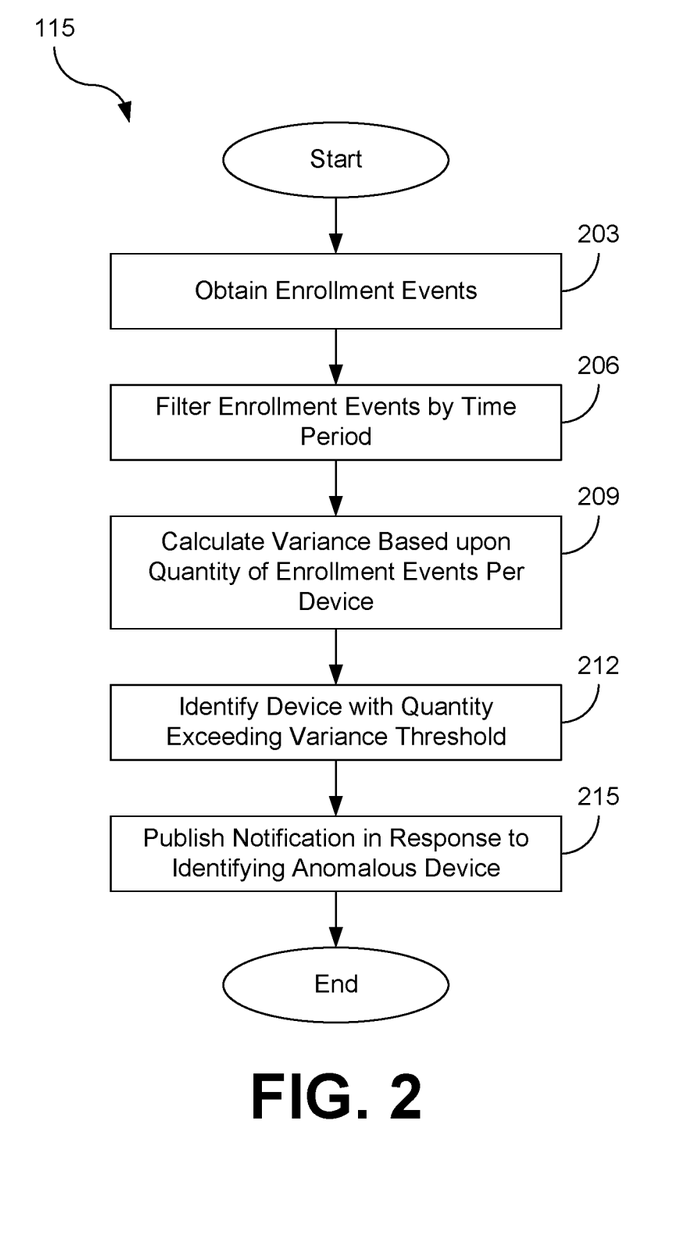
FIG. 2 is a flowchart illustrating one example of functionality implemented as portions of an application executed in a computing environment in the network environment of FIG. 1 according to various implementations of the present disclosure.

Referring next to FIG. 2, shown is a flowchart that provides one example of the operation of a portion of the management service 115 according to various implementations. It is understood that the flowchart of FIG. 2 provides merely an example of the many different types of functional arrangements that can be employed to implement the operation of the portion of the management service 115. As an alternative, the flowchart of FIG. 2 can be viewed as depicting an example of elements of a method implemented in the computing environment 103 according to one or more implementations.

Beginning at step 203, the management service 115 can obtain a plurality of device check-ins associated with a population of managed client devices 106. The device check-ins can correspond to communications between a client device 106 and the management service 115. The device check-ins can be respectively associated with a particular client device 106 that is managed by the management service 115. In one example, a device check-in can include or be tagged with a device identifier. A device check-in can also be tagged with a timestamp so that device check-ins from a particular time period can be analyzed.

At step 206, the device check-ins can be filtered by a particular time period. In the context of this disclosure, the time period can be preconfigured or adjustable by an administrator. The time period can be based on upon how often managed devices are configured to perform a device check-in with the management service 115. For example, if a client device 106 is configured to perform a device check-in every ten minutes, the time period can be configured at ten minutes. The time period can also be selected such that a large enough sample size of multiple device check-ins from a particular client device 106 are received so that anomalies can be detected by analyzing the quantity of received device check-ins. The time period can also be the most recent time period so that the process shown in FIG. 2 is detecting real-time anomalies.

At step 209, once the device check-ins are filtered according to time period, the management service 115 can calculate an average quantity of device check-ins over the time period as well as a variance or standard deviation. The variance or standard deviation can be utilized to identify anomalous devices in the population of managed devices.

At step 212, the management service 115 can identify an anomalous device that is associated with a quantity of device check-ins during the time period that exceeds a variance threshold. In one example, a client device 106 that is linked to a quantity of device check-ins that exceeds 1.5 times, three times, or another multiple of the variance or that is three standard deviations above a mean or average quantity of device check-ins can be identified as an anomalous device. In some examples, an anomalous device can be one that is in the top quartile or top ten percent in terms of device check-ins over the time period.

At step 215, the management service 115 can publish a notification in a notification channel that identifies the anomalous client device 106. The notification can be published by sending a message to a messaging tool, an issue tracking service, or a bug tracking service. The formatting of the notification can be based on a template that and administrator can create and modify over time. Additionally, the notification can request an administrator on an admin device 109 to specify one or more actions to be taken with respect to the anomalous device. The actions can also be specified by a notification template and provided in the notification channel to the admin device 109.

In one embodiment, the management service 115 can utilize an application programming interface (API) provided by a third party messaging service to publish the notification. The notification can include identifying information about the identified anomalous device. In some instances, the API can also allow the management service 115 to include actions and receive a response that triggers a selected action from the admin device 109. In other instances, the management service 115 can request that the administrator reply with a selection of an option by typing or vocalizing a response that selects an action to be taken on the device.

The action can be quarantining the anomalous device, causing the device to suspend device check-ins, delete data from the client device 106, installing a profile, or changing configuration parameters on the client device 106. In some examples, the management service 115 can be configured to automatically take one of the actions if no response to the notification is received within a timeout period from the admin device 109 to which the notification is published. Additionally, the notification can be published to multiple admin devices 109 associated with multiple administrators of the management service 115. In some examples, the time period selected by the process shown in FIG. 3 can be different depending upon a time period under analysis. For example, in some examples, real-time anomalies can be detected by analyzing a smaller time period in real time. In other examples, a larger historical time period can be selected to identify historical anomalies.

Figure 3:
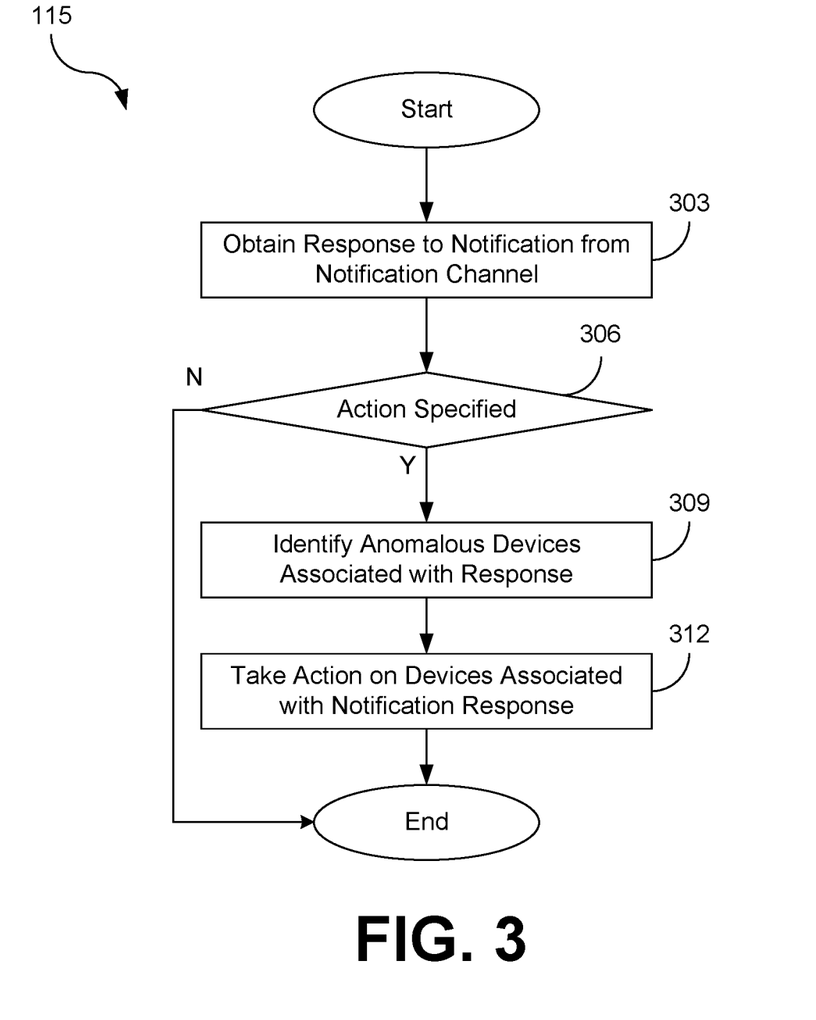
FIG. 3 is a flowchart illustrating one example of functionality implemented as portions of an application executed in a computing environment in the network environment of FIG. 1 according to various implementations of the present disclosure.

Referring next to FIG. 3, shown is a flowchart that provides another example of the operation of a portion of the management service 115 according to various implementations. It is understood that the flowchart of FIG. 3 provides merely an example of the many different types of functional arrangements that can be employed to implement the operation of the portion of the management service 115. As an alternative, the flowchart of FIG. 3 can be viewed as depicting an example of elements of a method implemented in the computing environment 103 according to one or more implementations. FIG. 3 illustrates how the management service 115 can obtain a response to a notification regarding an anomalous device and take a specified action on the anomalous device.

Beginning at step 303, the management service 115 can obtain a response to a notification about one or more anomalous devices that the management service 115 published to the notification channel. The response can be a text response obtained through a messaging system or a response received from an API provided by a messaging framework. In some embodiments, the management service 115 can be configured to automatically take a particular action on one or more identified anomalous devices after a timeout period if no response to a notification is received.

At step 306, the management service 115 can determine whether the response specifies an action to be taken on anomalous devices associated with the notification. The management service 115 can identify the action by determining whether a particular text response that corresponds to an action is received. The management service 115 can also determine whether a particular API response is received by the management service 115. In some cases, the management service 115 can also verify that an identifier corresponding to the anomalous devices is received in the response so that the management service 115 can verify that the specified action is being taken on the correct grouping of anomalous devices.

If no action can be identified as being specified in the response, the process moves to completion, and the management service 115 will take no action on the anomalous devices in response to the notification reply. In some embodiments, as noted above, the management service 115 can automatically take an action specified by a notification template on the grouping of anomalous devices if no response to a notification has been specified or received within a timeout period.

If an action is specified in the notification response, the process can proceed from step 306 to step 309. At step 309, the management service 115 can identify one or more anomalous devices in the notification response. The anomalous devices can be identified by detecting a unique identifier for a grouping of anomalous devices embedded in the response or by a sender of the notification response. For example, if the notification it sent to a particular admin device 109, the grouping of anomalous devices can be detected by identifying a phone number or other device identifier associated with the admin device 109 from which the notification response is obtained.

Next, at step 312, the specified action can be taken on the devices associated with the notification response. For example, the management service 115 can cause a device that is causing an anomalous quantity of device check-ins over a short period of time to be removed as a managed device. As another example, the anomalous device can be instructed to suppress device check-ins for a period of time. In some cases, the anomalous device can be factory reset by the management service 115. In another scenario, the management service 115 can lock the user account and/or logs the user out of his or her client devices 106 automatically. As another example, the management service 115 can disconnect or block a potentially anomalous device from connecting to the network 113 or place the client device 106 into a quarantine state. Additionally, the management service 115 can configure a firewall to block network traffic to or from an IP address (e.g., an IP address associated with a brute-force attack) of the client device 106. Similarly, the management service 115 can block data transfers to a particular client device 106 or IP address. Thereafter, the process proceeds to completion.

Figure 4:
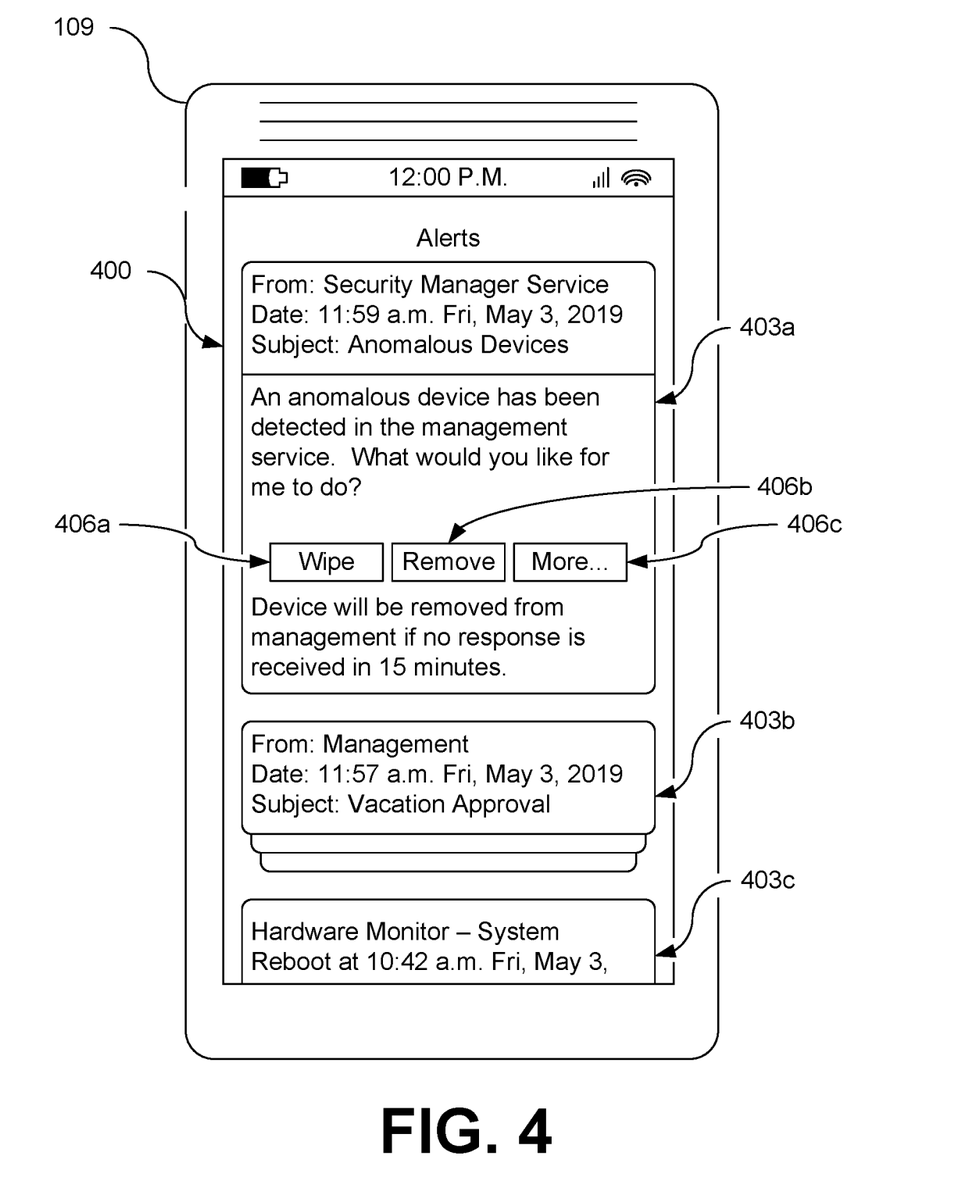
FIG. 4 is an example of a user interface rendered on a client device operating in the network environment of FIG. 1 according to various implementations of the present disclosure.

Moving on to FIG. 4, shown is a user interface 400 rendered on a display of an admin device 109, such as a smartphone or similar mobile device assigned to or operated by an administrative user. The user interface 400 may represent a dashboard, message or notifications screen, or similar user interface. Accordingly, the user interface 400 can include a number of notifications 403a, 403b, and 403c (collectively the "notifications 403") received from various applications or services, such as the management service 115. For example, an application on the admin device 109, such as a messaging application, can cause a notification 403a to be rendered in response to receiving a message from the management service 115 indicating detection of a potential anomalous device by the management service 115. The notification 403a could include one or more user interface elements 406a, 406b, 406c (collectively the "user interface elements 406"), which can allow an administrative user to respond to the notification 403a. The user interface elements 406 can be specified in a notification template.

For example, a first user interface element 406a can allow for the administrative user to explicitly authorize that the suggested remedial action be performed. A second user interface element 406b can allow for the administrative user to specify a different action to be performed. A third user interface element 406c may allow for the administrative user to receive more detailed information about the potential anomalous devices and potentially select from other suggested actions. In one embodiment, the user interface elements 406 can comprise links to a page provide by the management console 119. The link can include an identifier that uniquely identifies the notification and/or the grouping of anomalous devices associated with the notification.

Figure 5:
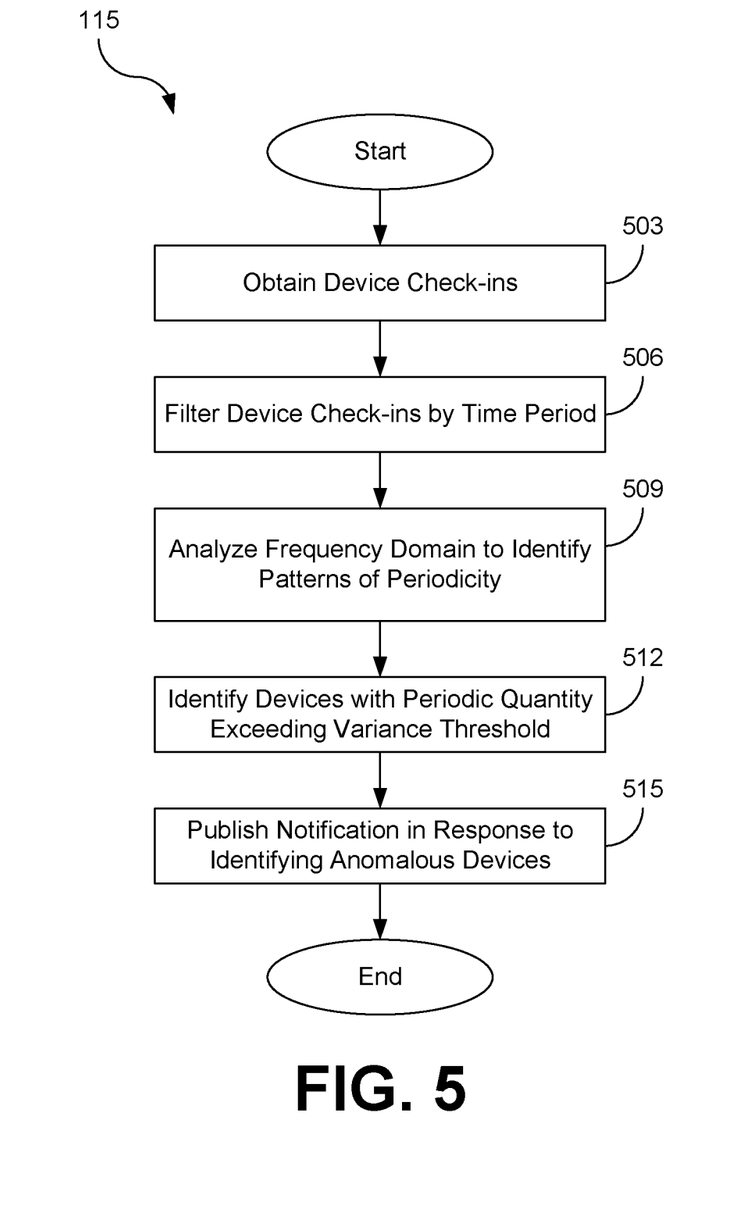
FIG. 5 is a flowchart illustrating one example of functionality implemented as portions of an application executed in a computing environment in the network environment of FIG. 1 according to various implementations of the present disclosure.

Referring next to FIG. 5, shown is a flowchart that provides another example of the operation of a portion of the management service 115 according to various implementations. It is understood that the flowchart of FIG. 5 provides merely an example of the many different types of functional arrangements that can be employed to implement the operation of the portion of the management service 115. As an alternative, the flowchart of FIG. 5 can be viewed as depicting an example of elements of a method implemented in the computing environment 103 according to one or more implementations. FIG. 5 illustrates how the management service 115 can identify an anomalous device that is causing a periodic elevated quantity of device check-ins in the management service 115.

Beginning at step 503, the management service 115 can obtain a plurality of device check-ins associated with a population of managed client devices 106. The device check-ins can correspond to communications between a client device 106 and the management service 115. The device check-ins can be respectively associated with a particular client device 106 that is managed by the management service 115. In one example, a device check-in can include or be tagged with a device identifier. A device check-in can also be tagged with a timestamp so that device check-ins from a particular time period can be analyzed.

At step 506, the device check-ins can be filtered by a particular time period. In the context of this disclosure, the time period can be preconfigured or adjustable by an administrator. The selected time period in the context of the process shown in FIG. 5 can be larger than the time period selected for detection of a real time anomaly.

At step 509, once the device check-ins are filtered according to time period, the management service 115 can calculate an average quantity of device check-ins over the time period as well as a variance or standard deviation. The variance or standard deviation can be utilized to identify anomalous devices in the population of managed devices. In some embodiments, the management service 115 can place the filtered set of enrollment events in the frequency domain and identify patterns of periodicity in the data set.

At step 512, the management service 115 can identify an anomalous device that is associated with a quantity of device check-ins during the time period that exceeds a variance threshold. In one example, a client device 106 that is linked to a quantity of device check-ins that exceeds 1.5 times, three times, or another multiple of the variance or that is one or more standard deviations above a mean or average quantity of device check-ins can be identified as an anomalous device. In some examples, an anomalous device can be one that is in the top quartile or top ten percent in terms of device check-ins over the time period. Additionally, an anomalous device can be one that is associated with a periodic elevated quantity of device check-ins that exceeds a variance threshold.

At step 515, the management service 115 can publish a notification in a notification channel that identifies the anomalous client device 106. The notification can be published by sending a message to a messaging tool, an issue tracking service, or a bug tracking service. The formatting of the notification can be based on a template that and administrator can create and modify over time. Additionally, the notification can request an administrator on an admin device 109 to specify one or more actions to be taken with respect to the anomalous device. The actions can also be specified by a notification template and provided in the notification channel to the admin device 109.

In one embodiment, the management service 115 can utilize an application programming interface (API) provided by a third party messaging service to publish the notification. The notification can include identifying information about the identified anomalous device. In some instances, the API can also allow the management service 115 to include actions and receive a response that triggers a selected action from the admin device 109. In other instances, the management service 115 can request that the administrator reply with a selection of an option by typing or vocalizing a response that selects an action to be taken on the device.

The action can be quarantining the anomalous device, causing the device to suspend device check-ins, delete data from the client device 106, installing a profile, or changing configuration parameters on the client device 106. In some examples, the management service 115 can be configured to automatically take one of the actions if no response to the notification is received within a timeout period from the admin device 109 to which the notification is published. Additionally, the notification can be published to multiple admin devices 109 associated with multiple administrators of the management service 115.

Figure 6:
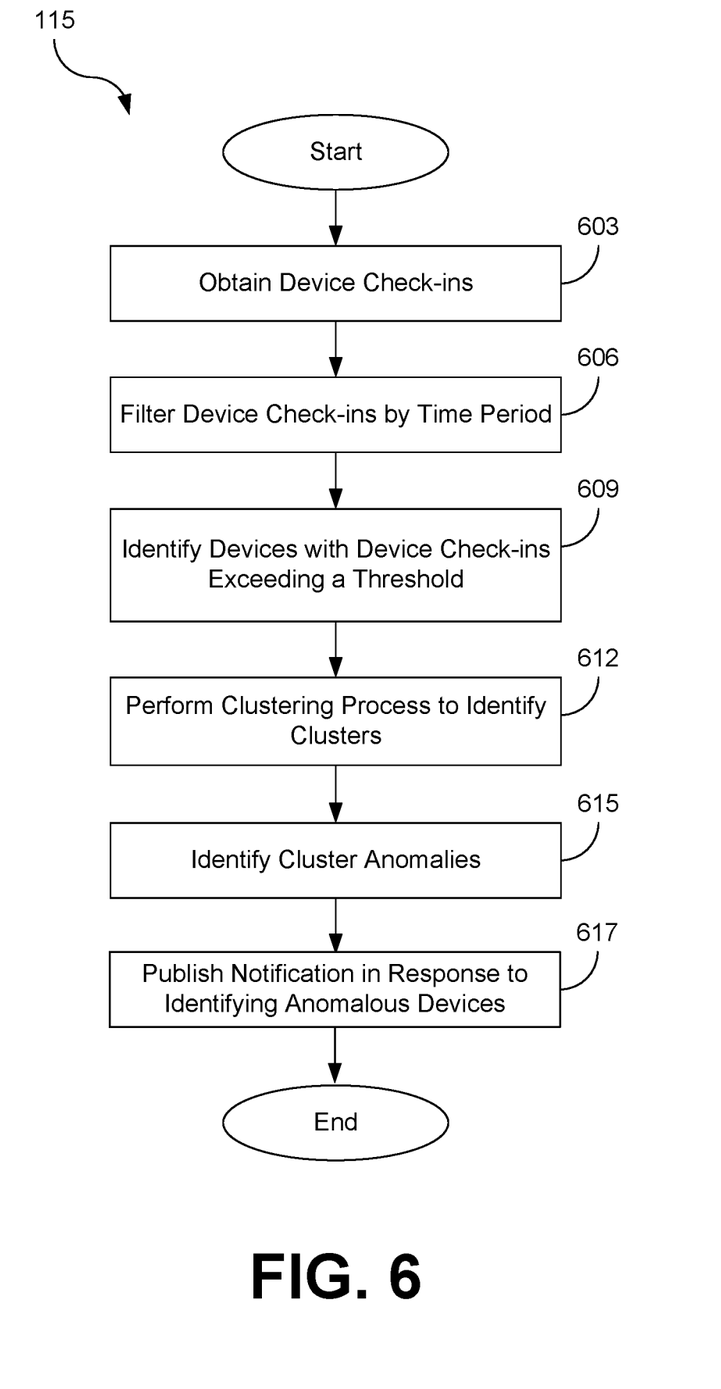
FIG. 6 is a flowchart illustrating one example of functionality implemented as portions of an application executed in a computing environment in the network environment of FIG. 1 according to various implementations of the present disclosure.

Referring next to FIG. 6, shown is a flowchart that provides another example of the operation of a portion of the management service 115 according to various implementations. It is understood that the flowchart of FIG. 6 provides merely an example of the many different types of functional arrangements that can be employed to implement the operation of the portion of the management service 115. As an alternative, the flowchart of FIG. 6 can be viewed as depicting an example of elements of a method implemented in the computing environment 103 according to one or more implementations. FIG. 6 illustrates how the management service 115 can identify a cluster of anomalous devices that are causing an elevated quantity of device check-ins in the management service 115.

Beginning at step 603, the management service 115 can obtain a plurality of device check-ins associated with a population of managed client devices 106. The device check-ins can correspond to communications between a client device 106 and the management service 115. The device check-ins can be respectively associated with a particular client device 106 that is managed by the management service 115. In one example, a device check-in can include or be tagged with a device identifier. A device check-in can also be tagged with a timestamp so that device check-ins from a particular time period can be analyzed.

At step 606, the device check-ins can be filtered by a particular time period. In the context of this disclosure, the time period can be preconfigured or adjustable by an administrator. The selected time period in the context of the process shown in FIG. 6 can be larger than the time period selected for detection of a real time anomaly.

At step 609, once the device check-ins are filtered according to time period, the management service 115 can calculate an average quantity of device check-ins over the time period as well as a variance or standard deviation. The variance or standard deviation can be utilized to identify anomalous devices in the population of managed devices.

At step 612, the management service 115 can identify a cluster of anomalous devices that is associated with a quantity of device check-ins during the time period that exceeds a variance threshold. The cluster can be identified using a hierarchical clustering algorithm that are generated similar quantities of device check-ins that are higher than a mean or average. Additionally, clusters can be identified based upon the similarity or overlapping of other characteristics, such as operating system, organizational group, location, or other parameters.

At step 615, the management service 115 can identify cluster anomalies. In another example, cluster anomalies can be detected by identifying a cluster of client devices that generate a quantity of device check-ins that are greater than an average quantity by less than the threshold quantity that is used to analyze the smaller time period above.

Cluster anomalies can also be detected by identifying devices that have a greater number of device check-ins during a particular time period and determining whether they can be grouped into cluster according to a parameter. The client devices 106 can be grouped in a cluster by a parameter, such as a property of the client device 106, an operating system of the client device 106, a manufacturer and/or model of the client device 106, versions of other applications installed on the client device 106, or other properties by which the devices can be grouped. Clusters can be generated, for example, by utilizing a clustering process, such as Hierarchical Agglomerative Clustering. Clusters with less than a threshold number of devices, such as ten or fewer devices, can be considered cluster anomalies.

Cluster anomalies can then be classified into various types. For example, anomalies can be automatically categorized as point anomalies, periodic anomalies, and cluster anomalies. The clustering process may determine that a large number of devices are not assigned to a cluster because they are simply not anomalies. For example, a grouping that contains 50% or greater than the population of the managed devices can be considered non-anomalous, or normal.

A point anomaly can be identified by quantizing a data set associated with a threshold quantity of device check-ins over a time period and observing a peak. A periodic anomaly can be identified by observing the signal in the frequency domain using a fast Fourier transform (FFT) and observing a spike above a certain threshold. The periodicity of the spike can also be observed. A cluster anomaly can be identified by identifying a grouping of devices that has a threshold number of devices between a minimum threshold and a maximum threshold.

By grouping client devices 106 into a cluster, the administrator can be assisted in determining an appropriate action to take with respect to the cluster to address the anomaly.

At step 617, the management service 115 can publish a notification in a notification channel that identifies the cluster of anomalous client devices 106. The notification can be published by sending a message to a messaging tool, an issue tracking service, or a bug tracking service. The formatting of the notification can be based on a template that and administrator can create and modify over time. Additionally, the notification can request an administrator on an admin device 109 to specify one or more actions to be taken with respect to the anomalous devices. The actions can also be specified by a notification template and provided in the notification channel to the admin device 109.

In one embodiment, the management service 115 can utilize an application programming interface (API) provided by a third party messaging service to publish the notification. The notification can include identifying information about the identified anomalous devices. In some instances, the API can also allow the management service 115 to include actions and receive a response that triggers a selected action from the admin device 109. In other instances, the management service 115 can request that the administrator reply with a selection of an option by typing or vocalizing a response that selects an action to be taken on the devices. Thereafter, the process proceeds to completion.

In some embodiments, the management service 115 can also analyze historical data about device check-ins in the data store 123 for capacity planning purposes. For example, by analyzing a larger period of time, such as weeks or months of device check-ins, the management service 115 can generate predictions about the quantity of device check-ins on a particular day, month, season, year, etc. In one example, an exponential averaging technique such as Holt-Winters can be utilized. Additionally, a machine learning approach can be utilized in which a model on a large dataset that can be reused it utilized. A Mean Absolute Percentage Error (MAPE) can also be utilized to generate projected quantities of device check-ins.

Additionally, the management service 115 can utilize a long short-term memory (LSTM) forecaster or neural network to generate a projected quantity of device check-ins. As a recurrent neural network (RNN), an LSTM can take a sequence of inputs and generate a sequence of outputs so that a historical set of data, such as historical quantities of device check-ins, can yield a predicted time series in the future.

Although the management service 115, management console 119, management component 124, and other various systems described herein can be implemented in software or code executed by general-purpose hardware as discussed above. The same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions or machine-readable instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The non-transitory computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

The invention claimed is:

1. A system for managing a plurality of client devices from a management service, comprising:
   a computing device comprising a processor and a memory, the computing device executing the management service that manages client devices that have been enrolled with the management service and have installed therein a management component for communicating with the management service; and
   machine-readable instructions stored in the memory that, when executed by the processor, cause the computing device to at least:
   store, by the management service in a command queue, one or more commands designated for one or more client devices of the plurality of client devices;
   obtain a set of device check-ins associated with the plurality of client devices over a first time period, wherein, during each device check-in of the set of device check-ins, the management component on a client device retrieves the one or more commands designated for the client device from the command queue and executes the retrieved one or more commands on the client device;
   calculate a variance of the set of device check-ins based on a quantity of device check-ins that correspond to individual client devices;
   identify an anomalous device based upon the quantity of device check-ins for the anomalous device exceeding a variance threshold; and
   publish a notification to a notification channel in response to identifying the anomalous device.

2. The system of claim 1, wherein the machine-readable instructions further cause the computing device to at least obtain a response in the notification channel to perform a remedial action with respect to the anomalous device.

3. The system of claim 2, wherein the machine-readable instructions that cause the computing device to perform the remedial action further cause the computing device to at least perform the remedial action in response to a reply received from an admin device associated with an administrative user.

4. The system of claim 1, wherein the variance threshold is based upon a calculated average variance of the set of device check-ins.

5. The system of claim 1, wherein the machine-readable instructions further cause the computing device to at least identify the anomalous device based upon an analysis of a second set of the device check-ins obtained over a second time period that is greater than the first time period.

6. The system of claim 1, wherein the machine-readable instructions further cause the computing device to at least execute a long short-term memory forecaster to detect a second quantity of device check-ins in a subsequent time period based upon a historical log of device check-ins.

7. A method of managing a plurality of client devices from a management service, wherein the client devices are enrolled with the management service and have installed therein a management component for communicating with the management service, said method comprising:
   storing, by the management service in a command queue, one or more commands designated for one or more client devices of the plurality of client devices;
   obtaining a set of device check-ins associated with the plurality of client devices over a first time period, wherein, during each device check-in of the set of device check-ins, the management component on a client device retrieves the one or more commands designated for the client device from the command queue and executes the retrieved one or more commands on the client device;
   calculating a variance of the set of device check-ins based on a quantity of device check-ins that correspond to individual client devices;
   identifying an anomalous device based upon the quantity of device check-ins for the anomalous device exceeding a variance threshold; and
   publishing a notification to a notification channel in response to identifying the anomalous device.

8. The method of claim 7, further comprising:
   obtaining a response in the notification channel to perform a remedial action with respect to the anomalous device.

9. The method of claim 8, wherein the remedial action is performed in response to a reply received from an admin device associated with an administrative user.

10. The method of claim 7, wherein the variance threshold is based upon a calculated average variance of the set of device check-ins.

11. The method of claim 7, further comprising:
identifying the anomalous device based upon an analysis of a second set of the device check-ins obtained over a second time period that is greater than the first time period.

12. The method of claim 7, further comprising:
executing a long short-term memory forecaster to detect a second quantity of device check-ins in a subsequent time period based upon a historical log of device check-ins.

13. A non-transitory, computer-readable medium comprising machine-readable instructions that, when executed by a processor, cause a computing device to carry out a method of managing a plurality of client devices that are enrolled with a management service and have installed therein a management component for communicating with the management service, said method comprising:
storing, by the management service in a command queue, one or more commands designated for one or more client devices of the plurality of client devices;
obtaining a set of device check-ins associated with the plurality of client devices over a first time period, wherein, during each device check-in of the set of device check-ins, the management component on a client device retrieves the one or more commands designated for the client device from the command queue and executes the retrieved one or more commands on the client device;
calculating a variance of the set of device check-ins based on a quantity of device check-ins that correspond to individual client devices;
identifying an anomalous device based upon the quantity of device check-ins for the anomalous device exceeding a variance threshold; and
publishing a notification to a notification channel in response to identifying the anomalous device.

14. The non-transitory, computer-readable medium of claim 13, said method further comprising:
obtaining a response in the notification channel to perform a remedial action with respect to the anomalous device.

15. The non-transitory, computer-readable medium of claim 14, wherein the remedial action is performed in response to a reply received from an admin device associated with an administrative user.

16. The non-transitory, computer-readable medium of claim 13, wherein the variance threshold is based upon a calculated average variance of the set of device check-ins.

17. The non-transitory, computer-readable medium of claim 13, said method further comprising:
identifying the anomalous device based upon an analysis of a second set of the device check-ins obtained over a second time period that is greater than the first time period.

18. The non-transitory, computer-readable medium of claim 13, wherein the machine-readable instructions further cause the computing device to at least execute a long short-term memory forecaster to detect a second quantity of device check-ins in a subsequent time period based upon a historical log of device check-ins.

19. The system of claim 1, wherein the machine-readable instructions further cause the computing device to at least:
detect a cluster anomaly based on the identified anomalous device and a second anomalous device, wherein the anomalous device and the second anomalous device are grouped into a cluster based on a property shared by the anomalous device and the second anomalous device.

* * * * *